(12) United States Patent
Or et al.

(10) Patent No.: US 10,870,579 B2
(45) Date of Patent: Dec. 22, 2020

(54) GRAPHENE PREPARATION METHOD BASED ON POLYPHASIC QUANTUM SELF-COUPLING REACTION

(71) Applicant: Leung Chit Or, Hong Kong (CN)

(72) Inventors: Leung Chit Or, Hong Kong (CN); Sze King James Leung, Hong Kong (CN); Yeuk Kee Szeto, Hong Kong (CN)

(73) Assignee: Leung Chit Or, Hong kong (CN)

( * ) Notice: Subject to any disclaimer, the term of this patent is extended or adjusted under 35 U.S.C. 154(b) by 279 days.

(21) Appl. No.: 16/095,357

(22) PCT Filed: Nov. 7, 2017

(86) PCT No.: PCT/CN2017/109718
§ 371 (c)(1),
(2) Date: Oct. 20, 2018

(87) PCT Pub. No.: WO2018/126780
PCT Pub. Date: Jul. 12, 2018

(65) Prior Publication Data
US 2019/0135636 A1    May 9, 2019

(30) Foreign Application Priority Data

Jan. 4, 2017   (CN) .......................... 2017 1 0003737

(51) Int. Cl.
*C01B 32/19*       (2017.01)
*C01B 32/225*     (2017.01)
*C05F 7/00*        (2006.01)

(52) U.S. Cl.
CPC ............ *C01B 32/19* (2017.08); *C01B 32/225* (2017.08); *C05F 7/00* (2013.01); *C01B 2204/04* (2013.01); *C01P 2006/80* (2013.01)

(58) Field of Classification Search
CPC ... C01B 32/19; C01B 32/225; C01B 2204/04; C01B 32/182; C01B 32/198; C01B 2204/00; C01B 2204/02; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/23; C05F 7/00; C05F 11/00; C01P 2006/80; Y02A 40/20; C05G 5/20
See application file for complete search history.

(56) References Cited

U.S. PATENT DOCUMENTS

| | | | |
|---|---|---|---|
| 2003/0157015 A1* | 8/2003 | Reinheimer | .......... C01B 32/225 423/448 |
| 2012/0330044 A1* | 12/2012 | Hou | ....................... B82Y 40/00 556/9 |

* cited by examiner

*Primary Examiner* — Daniel C. McCracken

(57) ABSTRACT

A graphene preparation method includes steps of: thoroughly mixing flake graphite powder with a intercalating agent through electrically string, then adding a reagent solution into a mixture of the flake graphite powder and the intercalating agent and thoroughly stirring for acting, so as to obtain no more than five layers of graphene; wherein the flake graphite powder, the intercalating agent and the reagent solution form a coexistence state of the three electronic phases; electronic phase resonance is induced among the materials, releasing a large amount of energy in the form of vibration and heat across interfaces between layers of carbon atoms, resulting in exfoliation of graphene. The thorough permeation of the intercalating agent ensures the electronic phase resonance can be induced in most layer interfaces, achieving few layer graphene which is equivalent to 5 layers or less.

6 Claims, No Drawings

GRAPHENE PREPARATION METHOD BASED ON POLYPHASIC QUANTUM SELF-COUPLING REACTION

CROSS REFERENCE OF RELATED APPLICATION

This is a U.S. National Stage under 35 U.S.C 371 of the International Application PCT/CN2017/109718, filed Jul. 11, 2017, which claims priority under 35 U.S.C. 119(a-d) to CN 201710003737.2, filed Jan. 4, 2017.

BACKGROUND OF THE PRESENT INVENTION

Field of Invention

The present invention relates to a technical field of graphene, and more particularly to a graphene preparation method based on a novel process called "Polyphasic Quantum Self-coupling Reaction (PQSR)".

Description of Related Arts

Graphene is widely used and it is necessary to obtain graphene from graphite. However, the structure of graphite itself is an ore-type structure in which flake structures are stacked. It is necessary to remove individual flakes from the stacked structure of raw ore to obtain graphene.

The conventional graphene production method has high requirements for processing conditions. The conventional production method incurs high cost and produces harmful waste disposal so it cannot achieve energy efficiency and environmental sustainability.

SUMMARY OF THE PRESENT INVENTION

For overcoming the above defects, the objective of the present invention is to provide a graphene preparation method based on a novel technology, called "Polyphasic Quantum Self-coupled Reaction" or "PQRS" with low energy consumption and no pollution discharge.

Accordingly, in order to accomplish the above object, the present invention provides a graphene preparation method based on PQSR, comprising steps of:

Thoroughly mixing flake graphite powder with an intercalating solution to form a premix, then adding a reagent into the premix and thoroughly stirring for reaction to begin, so as to produce few-layer graphene; wherein three different electronic phases of the flake graphite powder, the intercalating solution and the reagent coexist in the reactant; due to the coupling of different electronic phases of the flake graphite powder, the intercalating solution and the reagent, electronic phase resonance is induced among the materials, releasing a large amount of energy in the form of vibration and heat across interfaces between layers of carbon atoms, resulting in exfoliation of graphene.

Contents of a three-phase mixed reaction are:
Flake graphite powder of 50-150 g;
Intercalating agent of 500-1000 ml; and
Reagent solution of 50-100 ml.
The purity of the flake graphite powder is 99.99%.

According to volume fraction, the intercalating agent comprises 75% of high-oxygen water, 10% of peroxycarbonate, 10% of a non-ionic chelating agent and 5% of an oleophilic hydrophilic agent.

According to volume fraction, the reagent solution comprises 50% of $(NH_4)_4$.EDTA (Ethylenediaminetetraacetic acid) and 50% of diethylenetriaminepentaacetic acid.

Byproducts of PQSR reaction comprise of water vapor, oxygen, and liquid containing organic chelates, wherein the water vapor and the oxygen are directly discharged, while the liquid containing the organic chelates could be further synthesized into organic fertilizers for agricultural productions.

Beneficial effects are as follows.

Compared with conventional technologies, the graphene preparation method based on the polyphasic quantum self-coupling reaction of the present invention leverages the resonance of the different electronic phases of the materials to produce a great amount of energy within the system to achieve exfoliation of graphene. PQSR is designed to couple the electronic phases of the three substances, the reactant releases its energy due to its internal electronic resonance across the material. The energy is released in the form of intense vibration and hence promotes the disengagement of the affinity electronic force (Van der Waal Force) between the layer of graphene. As a result, flake graphite is exfoliated into graphene. No external energy source is required to initiate or sustain the reaction, resulting in superb energy saving compared to conventional graphene product methods. Because most of the materials are either consumed or easily separated, the final product is graphene with high purity, reserving the best properties of graphene itself while leaving no harmful discharge to the environment. Furthermore, the production cost is extremely low so the proliferation of graphene materials can be made possible.

DETAILED DESCRIPTION OF THE PREFERRED EMBODIMENT

For clearly understanding, the present invention will be further illustrated.

Embodiment 1

The present invention provides a graphene preparation method based on a polyphasic quantum self-coupling reaction, comprising steps of:

Thoroughly mixing 50 g flake graphite powder with 500 ml intercalating agent, then adding 50 ml reagent solution into a mixture of the flake graphite powder and the intercalating agent and thoroughly stirring for reacting, so as to obtain no more than five layers of graphene; wherein the flake graphite powder, the intercalating agent and the reagent solution form a coexistence state of the three electronic phases; electronic phase resonance is induced among the materials, releasing a large amount of energy in the form of vibration and heat across interfaces between layers of carbon atoms, resulting in exfoliation of graphene. The thorough permeation of the intercalating agent ensures the electronic phase resonance can be induced in most layer interfaces, achieving few layer graphene which is equivalent to 5 layers or less. Byproducts of the three-phase auto-coupling energy reaction comprise water vapor, oxygen, and liquid containing organic chelates, wherein the water vapor and the oxygen are directly discharged, while the liquid containing the organic chelates could be further synthesized into organic fertilizers for agricultural productions.

In the embodiment 1, a purity of the flake graphite powder is 99.99%.

In the embodiment 1, according to volume fraction, the intercalating agent comprises 75% of high-oxygen water, 10% of peroxycarbonate, 10% of a non-ionic chelating agent and 5% of an oleophilic hydrophilic agent.

In the embodiment 1, according to volume fraction, the reagent solution comprises 50% of (NH4)4.EDTA and 50% of diethylenetriaminepentaacetic acid.

Embodiment 2

The present invention provides a graphene preparation method based on a poly-phasic quantum self-coupling reaction, comprising steps of:

Thoroughly mixing 150 g flake graphite powder with 1000 ml intercalating agent, then adding 100 ml reagent solution into a mixture of the Hake graphite powder and the intercalating agent and thoroughly stirring for reacting, so as to obtain no more than five layers of graphene; wherein the flake graphite powder, the intercalating agent and the reagent solution form a coexistence state of the three electronic phases; electronic phase resonance is induced among the materials, releasing a large amount of energy in the form of vibration and heat across interfaces between layers of carbon atoms, resulting in exfoliation of graphene. The thorough permeation of the intercalating agent ensures the electronic phase resonance can be induced in most layer interfaces, achieving few layer graphene which is equivalent to 5 layers or less. Byproducts of the three-phase auto-coupling energy reaction comprise water vapor, oxygen, and liquid containing organic chelates, wherein the water vapor and the oxygen are directly discharged, while the liquid containing the organic chelates could be further synthesized into organic fertilizers for agricultural productions.

In the Embodiment 2, a purity of the flake graphite powder is 99.99%.

In the Embodiment 2, according to volume fraction, the intercalating agent comprises 75% of high-oxygen water, 10% of peroxycarbonate, 10% of a non-ionic chelating agent and 5% of an oleophilic hydrophilic agent.

In the Embodiment 2, according to volume fraction, the reagent solution comprises 50% of (NH4)4.EDTA and 50% of diethylenetriaminepentaacetic acid.

Compared with conventional technologies, the graphene preparation method based on the poly-phasic quantum self-coupling reaction of the present invention has phase combination in three aspects, wherein the energy of the auto-coupling reaction of multi-phase electron flows is combined with self-owned quantum resonance principles to separate the flake graphite and form the graphene. The method not only reduces energy consumption, but also provides fine layers of graphene with a high purity. Utilizing the electronic phases of various substances and the different quantum resonance basis of each substance, the internal energy is pulled out in the electron flow of a reaction, which produces acceleration of the auto-coupling electron energy reaction. Impulse between the electrons, phase reaction, and auto-coupling symbiotic electric energy reaction produce a large amount of energy which is converted into the heat energy. The increase in temperature promotes the disengagement of the affinity electronic force. As a result, energy loss flake graphite is generated. Due to an auto-coupling reaction, the electrons self-coupled with each other generate power, so that the scales can be released from the electron affinity energy, and then the scales are detached to form the graphene. The present invention is safe and eco-friendly, which achieves low energy consumption and zero pollution discharge. Furthermore, the production cost is extremely low, and current or future supply demands for graphene materials can be satisfied.

The above disclosures are only some preferred embodiments of the present invention, but the present invention is not limited thereto. Any changes that can be understood by those skilled in the art should fall into the protection scope of the present invention.

What is claimed is:

1. A graphene preparation method, comprising steps of:
thoroughly mixing flake graphite powder with an intercalating solution to form a premix, then adding a reagent into the premix and thoroughly stirring for reaction to begin, so as to produce few-layer graphene; wherein three different electronic phases of the flake graphite powder, the intercalating solution and the reagent coexist in a reactant; due to differences in electronic potential of the flake graphite powder, the intercalating solution and the reagent, the electronic phases of the flake graphite powder, the intercalating solution and the reagent interact with each other to induce resonance among electrons, releasing energy by sending out shock waves and heat across interfaces between layers of carbon atoms, resulting in exfoliation of the few-layer graphene.

2. The graphene preparation method, as recited in claim 1, wherein contents of a three-phase mixed reaction are:
the flake graphite powder of 50-150 g;
the intercalating agent of 500-1000 ml; and
the reagent solution of 50-100 ml.

3. The graphene preparation method, as recited in claim 1, wherein a purity of the flake graphite powder is 99.99%.

4. The graphene preparation method, as recited in claim 1, wherein according to volume fraction, the intercalating agent comprises 75% of oxygenated water, 10% of peroxycarbonate, 10% of a non-ionic chelating agent and 5% of an oleophilic hydrophilic agent.

5. The graphene preparation method, as recited in claim 1, wherein according to volume fraction, a reagent solution comprises 50% of (NH4)4.EDTA (Ethylenediaminetetraacetic acid) and 50% of diethylenetriaminepentaacetic acid.

6. The graphene preparation method, as recited in claim 1, wherein byproducts of a three-phase auto-coupling energy reaction comprise water vapor, oxygen, and liquid containing organic chelates, wherein the water vapor and the oxygen are directly discharged, while the liquid containing the organic chelates is further synthesized into organic fertilizers for agricultural productions.

* * * * *